Lewis & Udall,

Stilky Plow.

No. 3,330. Reissued Mar. 23. 1869

Witnesses;

H. F. Eberts

L. C. Hyde

Inventors,

J. B. Lewis and

J. E. Udall

By their Attorney

Thos S. Sprague

N. PETERS, PHOTO-LITHOGRAPHER, WASHINGTON, D. C.

UNITED STATES PATENT OFFICE.

J. B. LEWIS AND J. E. UDALL, OF CONCORD, ILLINOIS.

IMPROVEMENT IN SULKY-PLOWS.

Specification forming part of Letters Patent No. 81,799, dated September 1, 1868; Reissue No. 3,336, dated March 23, 1869.

*To all whom it may concern:*

Be it known that we, J. B. LEWIS and J. E. UDALL, of Concord, in the county of Morgan and State of Illinois, have invented a new and useful Improvement in Sulky-Plows; and we do declare that the following is a true and accurate description thereof, reference being had to the accompanying drawings, and to the letters of reference marked thereon, and being a part of this specification.

Figure 2:
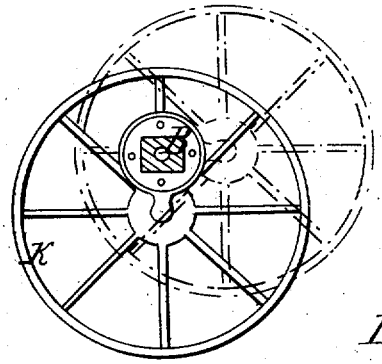
Figure 3:
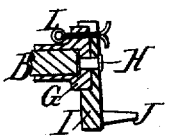
Figure 4:
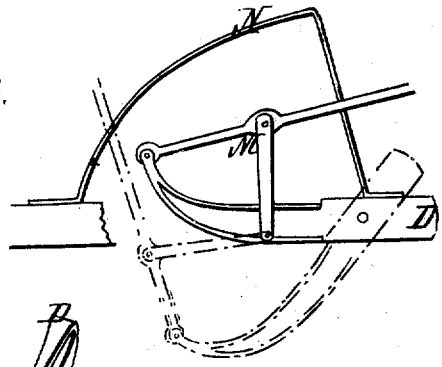
Figure 1:
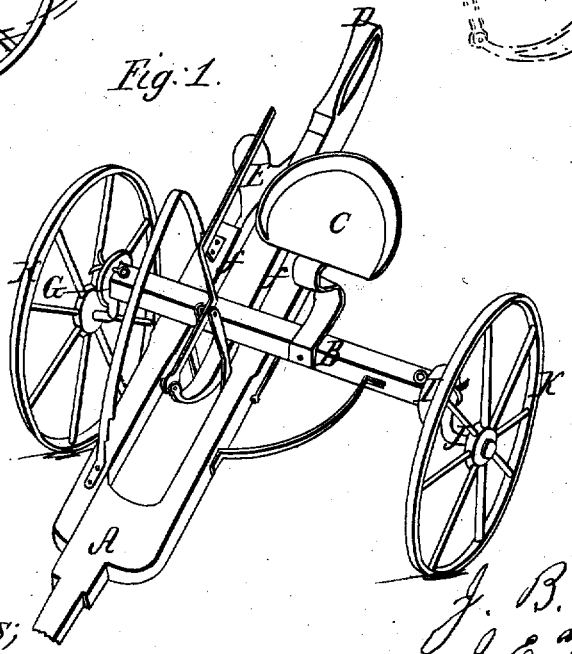

Figure 1 is a perspective view of our invention. Fig. 2 is a vertical section, showing the eccentric connection of the axle to the wheel. Fig. 3 is a vertical longitudinal section of the same. Fig. 4 shows the method of raising and lowering the plow-beam.

Like letters indicate like parts in each figure.

The nature of this invention consists in constructing a sulky-plow in such a manner that the depth of furrow may be varied at pleasure, and the plow instantly raised from the furrow by the driver, without leaving his seat, when an obstruction is met with or in moving from place to place.

A in the drawings represents the frame, to which is firmly secured the axle B, and which is surmounted by the seat C.

D is the plow-beam, pivoted between the rear ends of the frame A, and has the plow E secured to it.

F are washers between the plow-beam and the inner sides of the frame A. By placing one of these washers on each side of the beam, or both on one side, the furrows may be made nearer to or farther from each other to suit the size of the plow or the idea of the operator.

G are metallic flanges, rigidly secured to the outer ends of the axle.

I are eccentrics provided with wrist pins J, upon which revolve the traction-wheels K. These eccentrics are secured to the flanges G by means of the bolts H, and are held in any desired position relative to said flanges by the pins L, passing through proper holes in the same. By this construction we secure the raising or lowering of the axle from the ground, as may be necessary, to insure the proper depth of furrow.

M is a compound lever secured in any proper and desired position by entering proper notches in the quadrant N, and is designed to raise or lower the plow-beam at pleasure.

What we claim as our invention, and desire to secure by Letters Patent, is—

1. The flanges G, eccentrics I, bolts H, wrist-pins J, and pins L, when constructed, arranged, and operating substantially as and for the purposes herein described and shown.

2. The compound lever M, when constructed and operating substantially as and for the purposes described.

3. The arrangement of the above-named parts with the frame A, axle B, seat C, traction-wheels K, washers F, plow-beam D, plow E, and quadrant N, when combined and operating substantially as herein set forth.

J. B. LEWIS.
J. E. UDALL.

Witnesses:
B. F. MOSS,
GEORGE HOFFERBERT.